United States Patent [19]

Seki et al.

[11] Patent Number: 5,025,363
[45] Date of Patent: Jun. 18, 1991

[54] AUTOMATIC PROGRAMMING METHOD

[75] Inventors: Masaki Seki; Takashi Takegahara, both of Tokyo; Masatoshi Nakajima, Yamanashi, all of Japan

[73] Assignee: Fanuc Ltd., Yamanashi, Japan

[21] Appl. No.: 320,091

[22] PCT Filed: Jul. 15, 1988

[86] PCT No.: PCT/JP88/00704
§ 371 Date: Mar. 7, 1989
§ 102(e) Date: Mar. 7, 1989

[87] PCT Pub. No.: WO89/00475
PCT Pub. Date: Jan. 26, 1989

[30] Foreign Application Priority Data

Jul. 16, 1987 [JP] Japan .................................. 62-178091

[51] Int. Cl.⁵ .......................................... G05B 19/403
[52] U.S. Cl. ................................ 364/191; 364/474.04; 364/474.32; 219/69.12
[58] Field of Search ........... 364/474.08, 474.2, 474.25, 364/474.28, 474.3, 474.32, 167.01, 191, 474.04; 219/69.12, 69.15, 69.17

[56] References Cited

U.S. PATENT DOCUMENTS

| | | | |
|---|---|---|---|
| 4,587,608 | 5/1986 | Kishi et al. | 364/191 |
| 4,604,705 | 8/1986 | Imanishi | 364/474.32 |
| 4,704,687 | 11/1987 | Kishi et al. | 364/474.25 |
| 4,799,143 | 1/1989 | Tanaka et al. | 364/191 |

Primary Examiner—Jerry Smith
Assistant Examiner—Paul Gordon
Attorney, Agent, or Firm—Staas & Halsey

[57] ABSTRACT

In an automatic programming apparatus involving NC program data for wire-cut electric discharge machining according to the invention, data specifying an approach path and a departure path, as well as wire-cut machining conditions, are registered in advance. In automatic programming, rather than entering an approach path, departure path and machining conditions separately, only machining profiles (51, 52, ...) are successively defined, after which the machining profile data and the registered data are used to originate, for each and every machining profile (51, 52, ...), (i) approach NC data, (ii) NC data for moving a wire electrode along the machining profiles (51, 52, ...), and (iii) departure NC data.

8 Claims, 6 Drawing Sheets

AUTOMATIC PROGRAMMING METHOD

BACKGROUND OF THE INVENTION

This invention relates to an automatic programming method and, more particularly, to a method of automatically originating NC program data for wire-cut electric discharge machining.

DESCRIPTION OF THE BACKGROUND ART

In the origination of NC data for wire-cut electric discharge machining, automatic programming is performed in accordance with a procedure of the kind shown in FIG. 4 according to the prior art. Specifically, a machining profile is defined (step 1), followed by entry of data specifying an approach path for moving a wire electrode to a machining starting point on the machining profile (step 2). Next, the machining conditions necessary for wire-cut electric discharge machining, such as machining speed and wire offset diameter, are entered (step 3), as well as data specifying a departure path along which the wire electrode is retracted away from a machining end point on the machining profile (step 4). When entry of the data necessary for wire-cut electric discharge machining in accordance with the predetermined machining profile ends, a check is performed to determine whether to subject the workpiece to another machining operation (step 5). When machining is required, the processing from step 1 onward is repeated to again enter data specifying the machining profile, approach path, machining conditions and departure path. If it is not required to subject the workpiece to other machining, then the abovementioned entered data is used to successively originate NC program data for each and every machining profile (step 6).

FIG. 5 shows views for describing the data which specifies the approach path, in which FIG. 5(a) is for a case in which a machining starting hole $P_a$ is decided at a position of distance $l_1$ on an extension ES of a first machining pass $P_F$, a wire electrode 11 is fed at a cutting velocity $F_1$ along the extension ES from the machining starting hole $P_a$ to a starting point (machining starting point) $P_s$ of the first pass, after which the wire electrode is moved along the first pass PF (extension approach pattern). FIG. 5(b) is for a case in which the machining starting hole $P_a$ is decided at a position of distance $l_1$ on a tangent line TS to the first machining pass PF at the starting point (machining starting point) $P_s$ thereof, the wire electrode 11 is fed at the cutting velocity $F_1$ along the tangent line TS from the machining starting hole $P_a$ to the machining starting point $P_s$, after which the wire electrode 11 is moved along the first pass PF (tangent line approach pattern). FIG. 5(c) is for a case in which the machining starting hole $P_a$ is decided at a position of distance $l_1$ on a tangent circle TC to the first machining pass PF at the starting point (machining starting point) $P_s$ thereof, the wire electrode 11 is fed at the cutting velocity $F_1$ along the tangent circle TC from the machining starting hole $P_a$ to the machining starting point $P_s$, after which the wire electrode is moved along the first pass PF (tangent circle approach pattern). FIG. 5(d) is for a case in which the machining starting hole $P_a$ is decided at a position of distance $l_1$ on a normal line NS to the first machining pass PF at the starting point (machining starting point) $P_s$ thereof, the wire electrode 11 is fed at the cutting velocity $F_1$ along the normal line NS from the machining starting hole $P_a$ to the machining starting point $P_s$, after which the wire electrode 11 is moved along the first pass PF (normal line approach pattern).

FIG. 6 shows views for describing the data which specifies the departure path, in which FIG. 6(a) is for a case in which a wire departure point $P_a$ is decided at a position of distance $l_1$ on an extension ES of a last machining pass PL, the wire electrode 11 is retracted at the cutting velocity $F_1$ along the extension ES from the machining end point $P_e$ to the wire departure point $P_a$ (extension departure pattern). FIG. 6(b) is for a case in which the wire departure point $P_a$ is decided at a position of distance $l_1$ on a tangent line TS to the last machining pass PL at the end point (machining end point) $P_e$ thereof, and the wire electrode 11 is retracted at the cutting velocity $F_1$ along the tangent line TS from the machining end point $P_e$ to the wire point $P_a$ (tangent line departure pattern). FIG. 6(c) is for a case in which the wire departure point $P_a$ is decided at a position of distance $l_1$ on a tangent circle TC to the last machining pass PL at the end point (machining end point) $P_e$ thereof, and the wire electrode 11 is retracted at the cutting velocity $F_1$ along the tangent circle TC from the machining end point $P_e$ to the wire departure point $P_a$ (tangent circle departure pattern). FIG. 6(d) is for a case in which the wire departure point $P_a$ is decided at a position of distance $l_1$ on a normal line NS to the last machining pass PL at the end point (machining end point) $P_e$ thereof, the wire electrode 11 is retracted at the cutting velocity $F_1$ along the normal line NS from the machining end point $P_e$ to the wire departure point $P_a$ (normal line departure pattern).

In this conventional automatic programming method involving NC data for wire-cut electric discharge machining, (i) the data for specifying the approach path, (ii) the machining condition data and (iii) the data for specifying the departure path are entered separately each time a machining profile is entered. Consequently, data entry requires time; the greater the number of machining profiles, the longer the time needed. Also, the NC data automatic programming operation is a complicated one and operation errors occur.

SUMMARY OF THE INVENTION

Accordingly, an object of the present invention is to provide an automatic programming method involving NC program data for wire-cut electric discharge machining in which it is unnecessary to enter data for specifying approach paths, departure paths and other machining conditions.

Data specifying an approach path and a departure path, as well as wire-cut machining conditions, are registered in advance. In automatic programming, rather than entering an approach path, departure path and machining conditions separately, only machining profiles (51, 52, ...,) (see FIG. 3) are successively defined, after which the machining profile data and the registered approach path data, departure path data and machining condition data are used to originate NC program data for wire-cut electric discharge machining for each and every profile (51, 52).

DESCRIPTION OF THE PREFERRED EMBODIMENT

Figure 1:
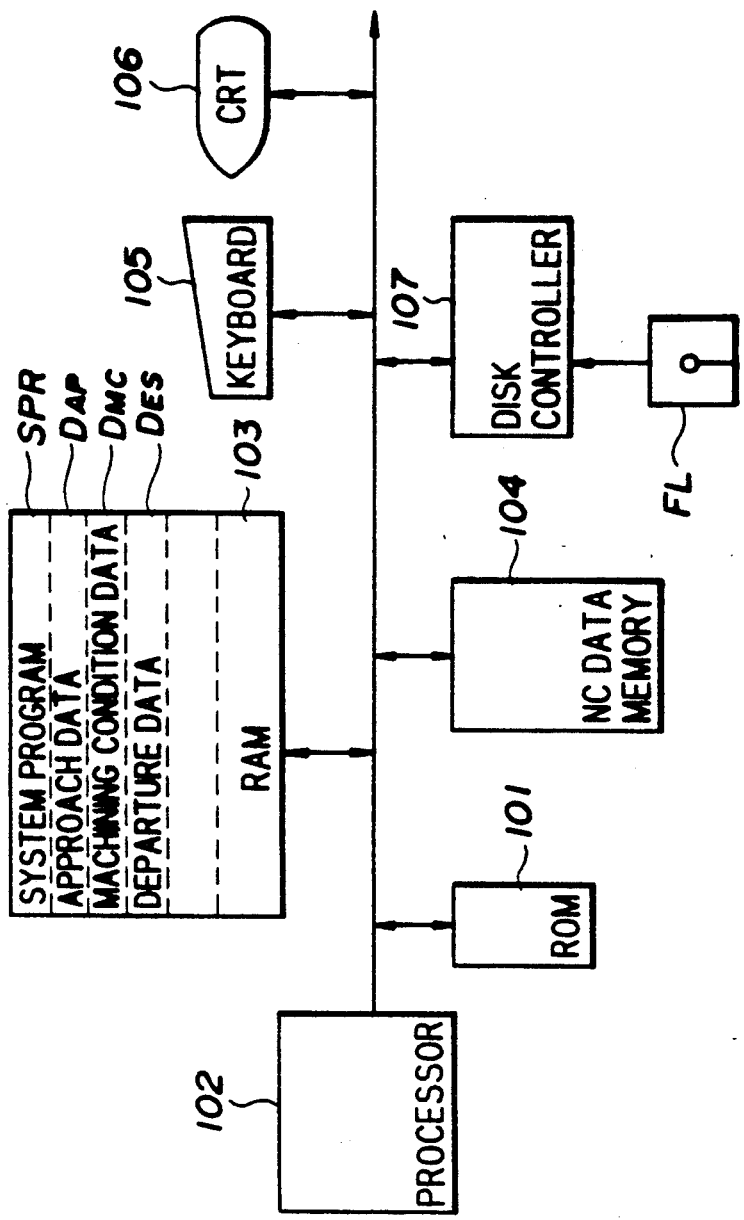
FIG. 1 is a block diagram of an automatic programming system to which the present invention can be applied.

FIG. 1 is a block diagram of an automatic programming system to which the present invention can be applied. Numeral 101 denotes a ROM in which a loading program is stored, 102 a processor, and 103 a RAM for storing (i) a system program for automatic programming, (ii) data for designating an approach path, machining conditions and a departure path in actual wire-cut electric discharge machining, and (iii) the results of processing. Numeral 104 denotes an NC data memory for storing originated NC program data, 105 a keyboard, 106 a graphic display unit (CRT), 107 a disk controller, and FL a floppy disk. Registered on the floppy disk FL in advance are (i) a system program SPR for originating NC program data for wire-cut electric discharge machining, and (ii) approach path data $D_{AP}$, departure path data $D_{ES}$ and various data for specifying machining conditions $D_{MC}$.

The data for specifying approach path are (i) data indicating the pattern from among those of FIGS. 5(a) through (d) in accordance with which an approach is to be made, (ii) the distance $l_1$ and (iii) the approach velocity $F_1$. The data for specifying the departure path are (i) data indicating the pattern from among those of FIGS. 6(a) through (d) in accordance with which a departure is to be made, (ii) the distance $l_1$ and (iii) the departure velocity $F_1$.

Figure 2:
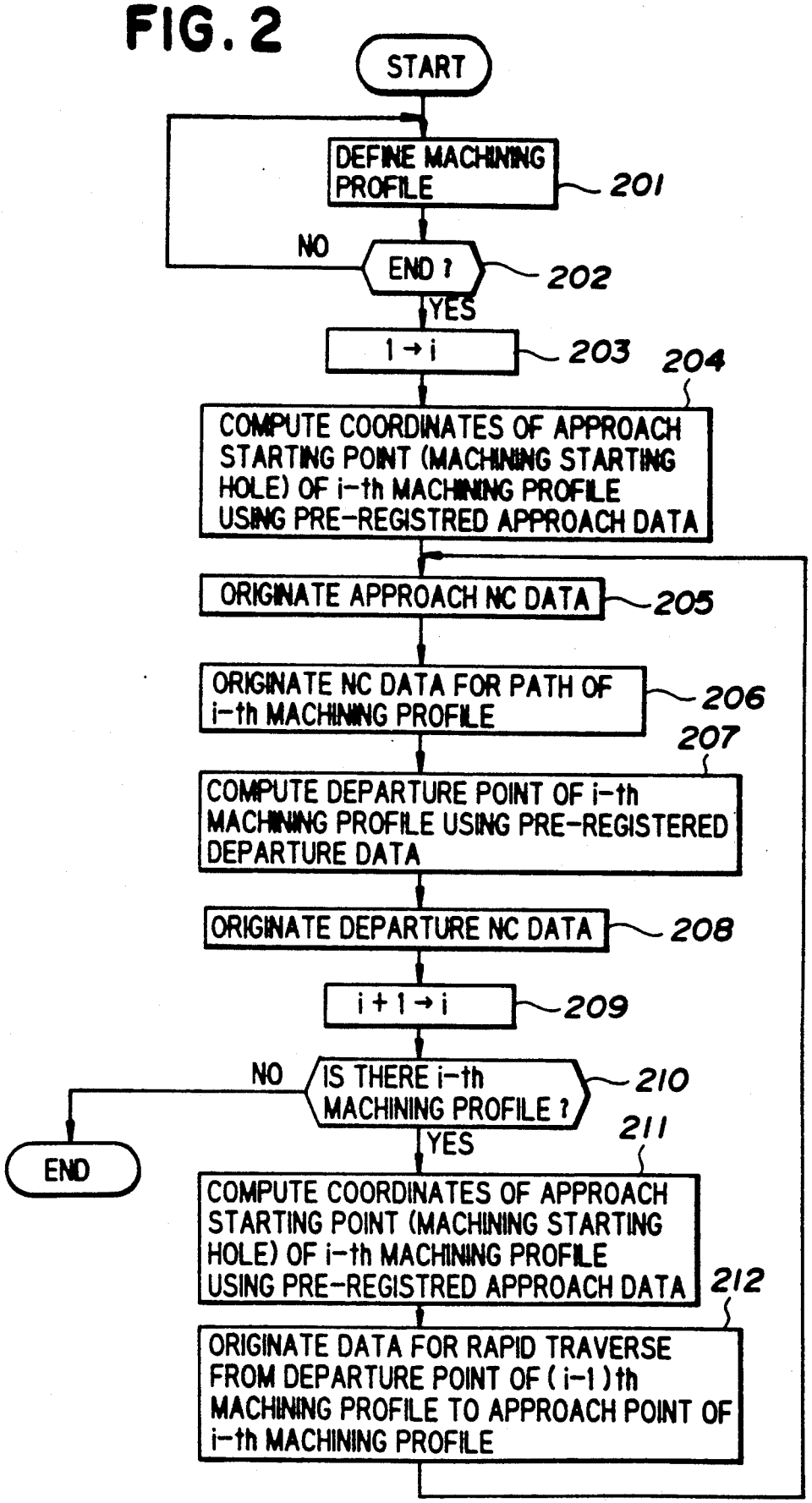
FIG. 2 is a flowchart of processing according to the invention.
Figure 3:
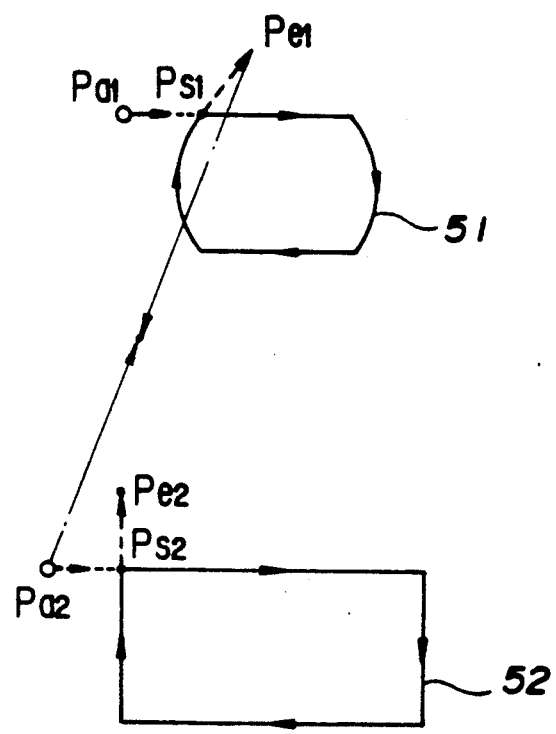
FIG. 3 is a view for describing the invention.
Figure 4:
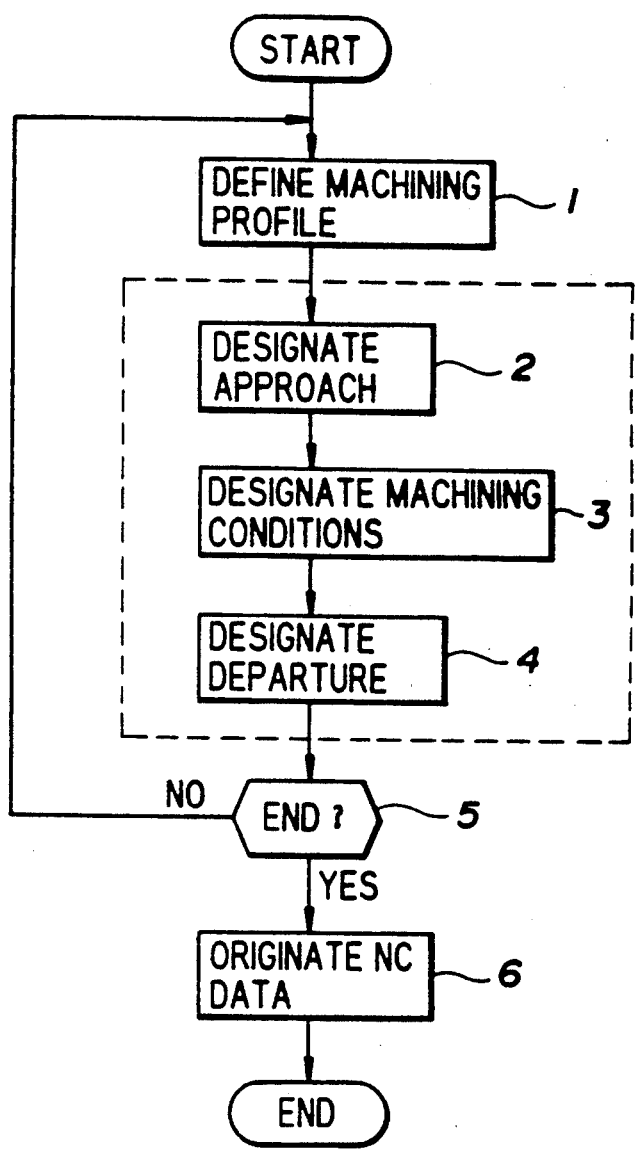
FIG. 4 is a flowchart of automatic programming processing according to the prior art.
Figure 5A:
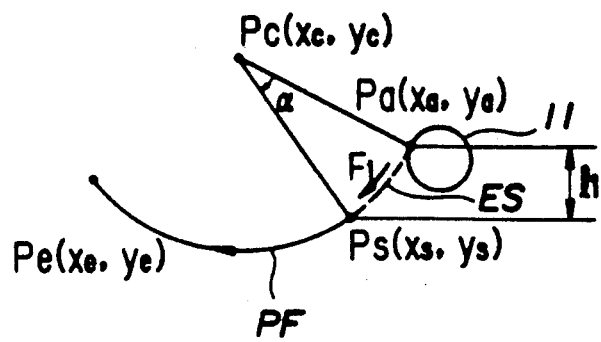
FIGS. 5(a–d) and 6(a–d) are views for describing an approach path, and departure path, respectively.
Figure 5B:
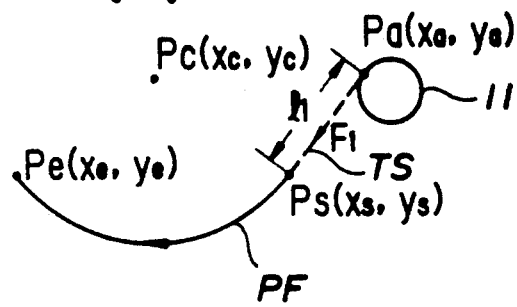
Figure 5C:
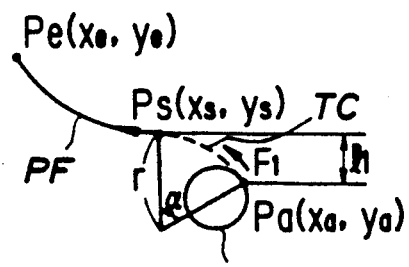
Figure 5D:
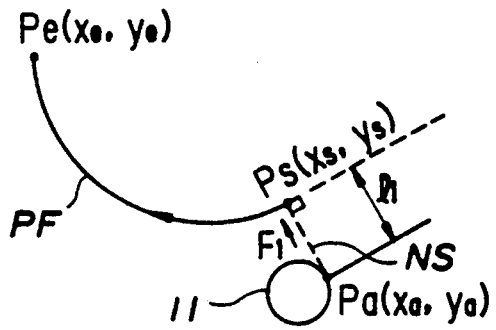
Figure 6A:
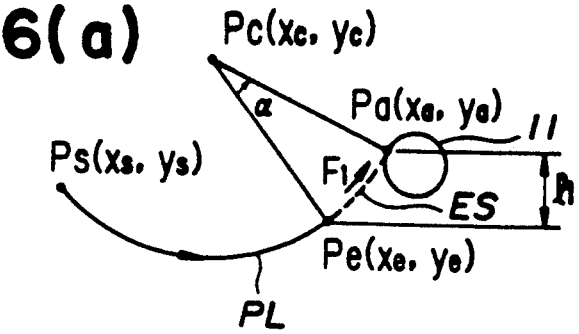
Figure 6B:
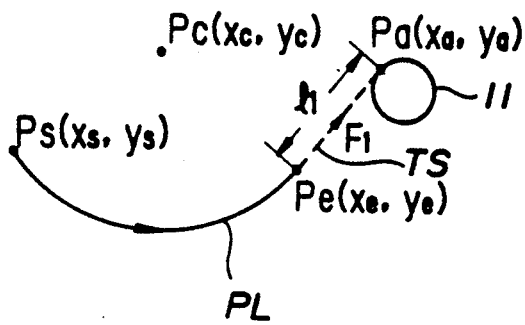
Figure 6C:
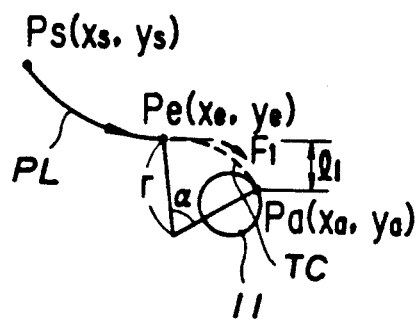
Figure 6D:
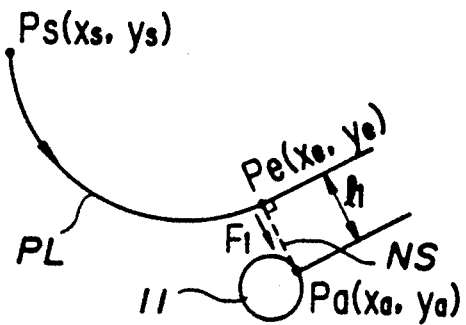

FIG. 2 is a flowchart of processing according to the invention, and FIG. 3 is a view for describing the invention. The method of the invention will now be described in accordance with FIGS. 1 through 3. It is assumed that the system program SPR for automatic programming and the various data $D_{AP}$, $D_{ES}$, $D_{MC}$ stored on the floppy disk FL have already been loaded in a predetermined storage area of the RAM 103 by the loading program. Also, it is assumed that the extension approach pattern shown in FIG. 5(a) has been designated by the approach path data $D_{AP}$, and that the tangent line departure pattern shown in FIG. 6(b) has been designated by the departure path data $D_{ES}$.

In originating NC data for wire-cut electric discharge machining, first machining profiles 51, 52, . . . , (see FIG. 3) that are mutually discontinuous are successively defined and entered (steps 201, 202) (see FIG. 2).

When definition and entry of all machining profiles ends, the processor 102 performs the operation 1→i (step 203) and computes the coordinates of an approach starting point (machining starting hole) $P_{ai}$ (see FIG. 3) of an i-th machining profile using the approach path data $D_{AP}$ and the path data of the first block of the i-th machining profile stored in the RAM 103 (step 204).

Thereafter, NC data for the approach from the machining starting hole $P_{ai}$ to a machining starting point $P_{si}$ of the i-th machining profile are originated (step 205), then the machining conditions and i-th machining profile data stored in the RAM 103 are used to originate path NC data for moving the wire electrode along the i-th machining profile (step 206).

When the origination of the path NC data is finished, the processor 102 computes the coordinates of a wire departure starting point $P_{ei}$ of the i-th machining profile using the departure path data $D_{ES}$ and the path data of the last block of the i-th machining profile stored in the RAM 103 (step 207). NC data for departure from the machining end point to the wire departure point $P_{ei}$ are then created (step 208).

When the origination of the NC data for the i-th machining profile ends, i is incremented by the operation i+1→i (step 209), after which a check is performed to determine if an i-th machining profile exists (step 210). If an i-th machining profile does not exist, automatic programming processing ends.

On the other hand, if an i-th machining profile does exist, coordinates of the approach starting point (machining starting hole) $P_{ai}$ of the i-th machining profile are computed using the approach path data $D_{AP}$ and the path data of the first block of the i-th machining profile stored in the RAM 103 (step 211).

The processor 102 subsequently originates:

(i) an M code (M□□) for wire severance;

(ii) NC data for positioning the wire electrode relative to the workpiece from a departure point $P_{e(i-1)}$ of an (i−1)th machining profile to the machining starting hole $P_{ai}$ of the i-th machining profile in a rapid-traverse mode; and (iii) a code (MOO) for automatic connection of the wire electrode (step 212). Thereafter, processing from step 205 onward is repeated to originate NC data for the i-th machining profile.

It should be noted that the reason why the approach path and departure path of each machining profile can be decided in accordance with exactly the same reference as set forth above is that the approach path, machining conditions and departure path in wire-cut electric discharge machining are decided in dependence upon, e.g., the degree of machining precision, and are not influenced by the machining profile.

In accordance with the present invention as described above, approach path, machining conditions and departure path are registered in advance. In the origination of NC data for wire-cut electric discharge machining, the arrangement is such that only machining profiles are defined, it being unnecessary to enter the abovementioned approach path, machining conditions and departure path. As a result, the data input operation is simplified. In addition, the operator can give undivided attention solely to the definition of machining profile. This makes it possible to reduce operation errors in originating NC data.

We claim:

1. An automatic programming method involving NC program data for wirecut electric discharge machining, comprising the steps of:

(a) presetting data for specifying an approach path, a departure path and wire-cut electric discharge machining conditions;

(b) successively setting two or more machining profiles; and (c) creating, for each of said machining profiles and after step (b), approach NC data, NC data for moving a wire electrode along the machining profile, and departure NC data using the machining profile and said preset data.

2. An automatic programming method involving NC program data for wire-cut electric discharge machining, comprising the steps of:

(a) presetting data for specifying an approach path, a departure path and wire-cut electric discharge machining conditions, including the sub-steps of specifying an approach path pattern, a distance between an approach starting point and a machining starting point, and an approach velocity;

(b) successively setting two or more machining profiles; and (c) creating, for each of said machining profiles and after step (b), approach NC data, NC data for moving a wire electrode along the machining profile, and departure NC data using the machining profile and said preset data, including the sub-steps of determining coordinates of the approach starting point for each of said machining profiles based on said approach path data and a first block of path data of the machining profile, and creating said approach NC data for causing said wire electrode to approach the machining starting point from the approach starting point along the approach path pattern.

3. An automatic programming method involving NC program data for wire-cut electric discharge machining, comprising the steps of:

(a) presetting data for specifying an approach path, a departure path and wire-cut electric discharge machining conditions, including the sub-steps of specifying a departure path pattern, a distance between a machining end point and a departure point, and a departure velocity;

(b) successively setting two or more machining profiles; and (c) creating, for each of said machining profiles and after step (b), approach NC data, NC data for moving a wire electrode along the machining profile, and departure NC data using the machining profile and said preset data, including the sub-steps of determining coordinates of the departure starting point for each of said machining profiles based on said departure path data and a last block of path data of the machining profile, and creating said departure NC data for causing said wire electrode to depart from the machining end point to the departure point along the departure path pattern.

4. An automatic programming method involving NC program data for wire-cut electric discharge machining, comprising the steps of:

(a) presetting data for specifying an approach path, a departure path and wire-cut electric discharge machining conditions;

(b) successively setting two or more machining profiles;

(c) creating, for each of said machining profiles and after step (b), approach NC data, NC data for moving a wire electrode along the machining profile, and departure NC data using the machining profile and said preset data; and (d) creating NC data for rapid-traverse of said wire electrode from a departure point of one of said machining profiles to an approach point of another of said machining profiles in a rapid-traverse mode.

5. An automatic programming method involving NC program data for wire-cut electric discharge machining, comprising the steps of:

(a) presetting data for specifying an approach path, a departure path and wire-cut electric discharge machining conditions;

(b) successively setting two or more machining profiles;

(c) creating, for each of said machining profiles and after step (b), approach NC data, NC data for moving a wire electrode along the machining profile, and departure NC data using the machining profile and said preset data;

(d) creating NC data for rapid-traverse of said wire electrode from a departure point of one of said machining profiles to an approach point of one of said machining profiles in a rapid-traverse mode;

(e) creating a command for wire severance before creating said NC data for rapid-traverse; and (f) creating a command for automatic wire connection after creating said NC data for rapid-traverse.

6. An automatic programming method for wire-cut electric discharge machining using a processor and a memory, comprising the steps of:

(a) presetting in the memory, data for specifying an approach path, a departure path and wire-cut electric discharge machining conditions;

(b) successively defining in the memory, a plurality of machining profiles; and (c) creating in the processor after step (b), based upon one of said machining profiles defined in step (b) and said data preset in step (a), approach NC data, NC data for moving a wire electrode along said one machining profile, and departure NC data for said one machining profile.

7. A method for wire-cut electric discharge machining using a processor and a memory, comprising the steps of;

(a) presetting in the memory, data for specifying an approach path, a departure path and wire-cut electric discharge machining conditions;

(b) successively defining in the memory, a plurality of machining profiles;

(c) creating in the processor after step (b), based upon one of said machining profiles defined in step (b) and said data preset in step (a), approach NC data, NC data for moving a wire electrode along said one machining profile, and departure NC data for said one machining profile; and (d) repeating step (c) for another machining profile.

8. An apparatus for automatically programming NC program data for wire-cut electric discharge machining, comprising:

means for presetting data specifying an approach path, a departure path and wire-cut electric discharge machining conditions;

means for defining a plurality of machining profiles; and means for creating after said machining profiles have been defined, based upon said machining profiles and said preset data, approach NC data, NC data for moving a wire electrode along the machining profile, and departure NC data for each of said machining profiles.

* * * * *

UNITED STATES PATENT AND TRADEMARK OFFICE
CERTIFICATE OF CORRECTION

PATENT NO. : 5,025,363

DATED : June 18, 1991

INVENTOR(S) : Masaki Seki et al.

It is certified that error appears in the above-identified patent and that said Letters Patent is hereby corrected as shown below:

Col. 1, before line 5, insert --Field of the Invention--;
line 41, change "$P_f$" to --PF--.

Col. 4, line 54, change "wirecut" to --wire-cut--.

Col. 6, line 38, change "of;" to --of:--.

Signed and Sealed this

Third Day of November, 1992

Attest:

DOUGLAS B. COMER

Attesting Officer

Acting Commissioner of Patents and Trademarks